United States Patent
Chevalier et al.

(10) Patent No.: US 7,283,790 B2
(45) Date of Patent: Oct. 16, 2007

(54) BLIND PROCESS AND RECEIVER TO DETERMINE SPACE-TIME PARAMETERS OF A PROPAGATION CHANNEL

(75) Inventors: Pascal Chevalier, Courbevoie (FR); Lisa Perros-Meilhac, Le Cannet (FR); Eric Moulines, Paris (FR)

(73) Assignee: Thales, Paris (FR)

( * ) Notice: Subject to any disclaimer, the term of this patent is extended or adjusted under 35 U.S.C. 154(b) by 1420 days.

(21) Appl. No.: 10/020,934

(22) Filed: Dec. 19, 2001

(65) Prior Publication Data

US 2002/0164955 A1 Nov. 7, 2002

(30) Foreign Application Priority Data

Jan. 9, 2001 (FR) .................................. 01 00540

(51) Int. Cl.
*H04B 17/00* (2006.01)
(52) U.S. Cl. ............... 455/67.11; 455/9; 455/506; 375/224
(58) Field of Classification Search ............ 455/67.11, 455/226.1, 9, 10, 500–506, 225, 226.3, 423–425; 375/224, 227, 229
See application file for complete search history.

(56) References Cited

U.S. PATENT DOCUMENTS

| | | | |
|---|---|---|---|
| 5,752,168 A | | 5/1998 | Monot et al. |
| 5,812,090 A | | 9/1998 | Chevalier et al. |
| 5,870,430 A | | 2/1999 | Pipon et al. |
| 6,118,832 A | | 9/2000 | Mayrargue et al. |
| 6,157,909 A | * | 12/2000 | Mauuary et al. ............ 704/228 |
| 6,239,746 B1 | | 5/2001 | Pipon et al. |
| 6,240,098 B1 | | 5/2001 | Thibault et al. |
| 6,243,415 B1 | | 6/2001 | Pipon et al. |
| 6,349,207 B1 | | 2/2002 | Monot et al. |

FOREIGN PATENT DOCUMENTS

EP 0 926 510 A1 6/1999

OTHER PUBLICATIONS

Agnes Desmezieres, et al. "Polarization in Space-Time Processing for Propagation Channel Identification", 2nd IEEE Workshop on Signal Processing Advances in Wireless Communications, May 9-12, 1999, pp. 395-398.
Kim Soohong, et al. "Blind Space-Time Channel Estimation of Spread-Spectrum Signal Using the Minimum Variance Approach", Proceedings of IEEE Military Communications Conference (Milcom'00), vol. 1, Oct. 22-25, 2000, pp. 159-163.
Michaela C. Vanderveen, et al. "Improved Blind Channel Identification Using a Parametric Approach", IEEE Communications Letters, IEEE Service Center, vol. 2, No. 8, Aug. 1, 1998, pp. 226-228.

* cited by examiner

*Primary Examiner*—Melur Ramakrishnaiah
(74) *Attorney, Agent, or Firm*—Oblon, Spivak, McClelland, Maier & Neustadt, P.C.

(57) ABSTRACT

Blind or partially blind process to determine characteristic space-time parameters of a propagation channel in a system comprising at least one reception sensor receiving a signal y(t). It comprises at least one step in which the specular type structure of the channel is used and a step for the joint determination of parameters such as antenna vectors (a) and/or time vectors ($\tau$) starting from second order statistics of the received signals.

Application for monitoring the spectrum of a propagation channel for positioning purposes starting from one or several HF stations or for standard communication links with equalization or positioning or spatial filtering.

10 Claims, 1 Drawing Sheet

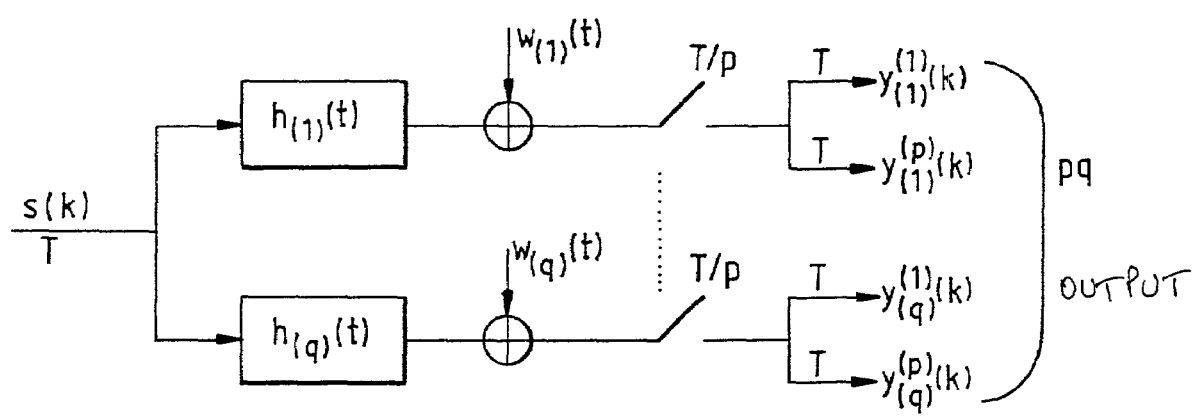

BLIND PROCESS AND RECEIVER TO DETERMINE SPACE-TIME PARAMETERS OF A PROPAGATION CHANNEL

FIELD OF THE INVENTION

This invention relates to a process and a receiver for blind identification of characteristic parameters of a propagation channel, particularly from second order statistics of the signal received by a sensor.

For example, the identified parameters are the delay and attenuation of channel paths.

The invention is particularly applicable in the field of mobile radiocommunications or ionospheric HF links.

BACKGROUND

Specular Channel

HF mobile or ionospheric radiocommunications are affected by the multiple path phenomenon. In urban areas, the transmitted signal is reflected and diffracted on fixed or moving obstacles present in the environment. For HF transmissions, the reflections are made on different layers of the ionosphere. In the case of propagation channels that can be qualified as specular, in other words the transmission takes place along a limited number of discrete or temporary paths characterized by a delay and a complex attenuation. Assuming an observation time compatible with the stationarity duration of the channel, multi-sensor reception and specular propagation, the expression for the multi-sensor channel is:

$$c(t) = \sum_{k=1}^{d} a_k \delta(t - \tau_k) \quad (1)$$

where k is the index of a path, $a_k$ is the vector for which the components are complex attenuations of the path k for the different channels, $\tau_k$ is the delay associated with the kth path and d is the number of paths in a channel.

Furthermore, if each path k is incident on the network following a reduced spatial diffusion cone, the expression (1) is in the following form $$c(t) = \sum_{k=1}^{d} \beta_k a(\theta_k) \delta(t - \tau_k) \quad (2)$$

where $a(\theta_k)$ is the input vector for an angle associated with the kth path and $\beta_k$ is the complex attenuation of the path.

In the first case (Eq. 1), the channel is not defined by parameters related to the direction from which the paths arrive, each propagation path is defined by parameters consisting of an arrival time τ and an <<antenna vector>> a. Thus, the calibration is no longer necessary and algorithms are no longer limited by spatial dispersion or coherent paths.

In the second case (Eq. 2), paths are defined by parameters consisting of their directions of arrival, which assumes that the type of the antenna is known and therefore generally involves setting up a calibration to estimate the values of $\theta_k$.

Blind Identification

In active or driven systems, the channel parameters are calculated during a learning phase in which the transmitter transmits a sequence known to the receiver.

If the propagation channel fluctuates in time, particularly due to movements of mobile stations or ionospheric layers, the sequence must be sent periodically in order to update the value of the parameters.

If this type of system is efficient, the regular transmission of a learning sequence can cause a significant reduction in the effective throughput.

For example, in the STANAG 4285 standard for cooperative ionospheric HF transmissions, half of the transmitted symbols are learning symbols.

Prior art also includes different blind methods and systems, in which parameters are estimated starting from statistics of the received signal, without any advance knowledge of the learning sequence.

Second Order Techniques

For example, the proposed techniques simply use second order statistics (space-time covariance matrix) of the received signal. Second order algorithms have better convergence properties than higher order algorithms, i.e. the variance of second order estimators for a given number of symbols, is usually less than the variance of estimators with higher orders. Furthermore, they have fewer local optimisation problems than techniques with higher orders.

Various methods and algorithms have been developed, such as those described in document entitled "Multichannel Blind Identification : from subspace to maximum likelihood methods" by L. Tong and S. Perreau; Proceedings of the IEEE, 86(10): 1951-1967, October 1998. One of the disadvantages of these algorithms is that the length of the global transmission channel has to be known, and most of them are intolerant to an error in the estimate of this length. When the bandwidth of the transmission is limited, the channel length is only defined approximately and these algorithms can no longer be used.

State of the Art for Blind Parametric Identification

Most work on blind identification of characteristic propagation parameters uses decoupled algorithms, i.e. algorithms that independently estimate arrival times and antenna vectors or arrival directions. These include direction finding algorithms to estimate directions of arrival, and coherent source separation algorithms to estimate antenna vectors. A lot of work has also be done on estimating arrival times.

Joint estimating methods can improve the precision and resolution of estimators, such that parameters can be estimated even when delays (or angles) are very similar.

The main work done on blind joint estimating of parameters (θ,τ) is described in the following references:

"Identification spatio-temporelle de canaux de propagation à trajets multiples" ("Space-time identification of multipath propagation channels) by J. Gouffraud, PhD thesis, Ecole Normale Supérieure de Cachan, 1997, and "Improved blind channel identification using a parametric approach" by M. C. Vanderveen and A. Paulraj, IEEE Communications Letters, pages 226-228, August 1998.

The idea is that criteria used to make a blind estimate of the pulse response may be directly minimized as a function of the angles and delays, using subspace type criteria like those described in the "Subspace methods for the blind identification of multichannel FIR filters" paper by E. Moulines, P. Duhamel, J-F. Cardoso and S. Mayrargue, IEEE Trans. on signal Processing, 43(2): 516-525, February 1995. These algorithms require that the transmission/reception filter is known in advance and that the antenna is calibrated.

Furthermore, an example of a method of making a joint blind estimate of parameters (a,τ) is described in the "Methods for blind equalization and resolution of overlapping echoes of unknown shape" paper by A. Swindlehurst and J. Gunther, IEEE Trans. on Signal Processing, 47(5): 1245-1254, May 1999. The authors work in the frequency range and propose an iterative IQML type algorithm to give an approximate solution with a maximum probability and an explicit initialisation algorithm based on the ESPRIT algorithm. These algorithms do not require advance knowledge of the transmission filter, but do have the disadvantage that a Fourier transformation is necessary before processing.

SUMMARY OF THE INVENTION

The invention relates to a blind or partially blind process that can determine at least the characteristic space-time parameters of a propagation channel in a system comprising at least one sensor for reception of signals y(t), characterized in that it comprises at least one step in which the specular type structure of the channel is taken into account and a step for the joint determination of space-time parameters such as antenna vectors (a) and/or time vectors (τ) starting from second order statistics of the signals received on one or several sensors.

According to one embodiment, it comprises a step in which the received signal y(t) is oversampled, for example with a sampling period equal to T/p, where T is the symbol period.

According to another embodiment, the process comprises a reception step on at least two sensors and an oversampling step.

For example, the process according to the invention may be applied for standard links for equalization, positioning and spatial filtering purposes, or for monitoring the spectrum of a propagation channel for positioning purposes starting from one or several HF stations.

In particular, the invention has the following advantages:
there is no need to transmit a learning sequence that may reduce the effective transmission throughput, or to know the length of the global transmission channel,
it is tolerant to an overestimate of the order of the transmission channel.

BRIEF DESCRIPTION OF THE DRAWINGS

Other advantages and characteristics of the invention will become clear after reading the following description with reference to the single FIGURE given for illustrative purposes and in no way limitative, and that shows the schematic for a radio-communication receiver according to the invention.

DESCRIPTION OF THE PREFERRED EMBODIMENT

We will mention a few remainders, assumptions and definitions before going on to describe the steps in the process according to the invention.

Assumptions and Model

The Single Sensor Signal Model
The transmitted signal is in the form $$x(t) = \sum_{I \in Z} g(t - IT)s(I) \quad (3)$$

where g(t) is the transmission/reception filter and values in {s(I)} are information symbols that were sent at the symbol period T.

The system assumes that the carrier frequency and the symbol period are estimated in advance. The signal received in base band is written $$y(t) = \sum_{I \in Z} h(t - IT)s(I) + w(t) \quad (4)$$

where the values of {s(I)} are information symbols that were sent at the symbol period T, h(t) is the pulse response of the transmission channel, and w(t) is an additive noise. The received signal sampled at the symbol period follows the discrete model:

$$y(k) = y(kT) \sum_{I \in Z} h(k - I)s(I) + w(k) \quad (5)$$

where h(I)=h(IT) (assuming that the sampling phase is equal to 0).

The Multichannel System

FIG. 1 represents a multichannel reception system comprising a number q of reception sensors and a means of oversampling the signal s(k) corresponding to path index k.

Obviously, without going outside the framework of the invention, the process can also apply to receivers comprising several sensors without any means of oversampling, or comprising a single sensor and a means of oversampling the received signal.

In the example embodiment given below, the device considered is a multichannel system combining spatial diversity and time diversity, i.e the signal is received on a network of q sensors Ci each having a response $h_{(i)}(t)$ and it is then oversampled with respect to the symbol period T, at the rate T/p as shown in FIG. 1. Oversampling is done using an appropriate device. The global pulse response of the transmission channel and the multi-sensor observations vector are defined by the following q×1 column vectors:

$$h(t)=[h_{(1)}(t), \ldots, h_{(q)}(t)]^T \quad (6)$$

$$y(t)=[y_{(1)}(t), \ldots, y_{(q)}(t)]^T \quad (7)$$

The subscript indicates the sensor number and the superscript T represents the transpose of a matrix. Bold characters indicate a spatial dimension. The samples obtained by sampling at rate T/p are vectorized by collecting signals sampled in the same sampling phase within a symbol period. More precisely, a path is associated with each of the p different sampling phases at the symbol rate, thus creating a multipath channel with p outputs on each sensor. This gives a multipath channel with p.q outputs. The global pulse response of the transmission channel and the multipath observations vector are defined by the following column vectors p.q×1:

$$\underline{h}(k)=[h^{(1)}(kT) \ldots h^{(p)}(kT)]^T \tag{8}$$

$$\underline{y}(k)=[y^{(1)}(kT) \ldots y^{(p)}(kT)]^T \tag{9}$$

The superscript indicates the sampling phase, $$h^{(i)}(kT)=h(kT+(i-1)T/p), \, y^{(i)}(kT)=y(kT+(i-1)T/p).$$

Assumptions

The process according to the invention is based on a number of assumptions, and particularly the following.

Symbols Source

H 1—For example, process $\{s(k)\}$ is a complex white noise that may also be circular at the second order of unit variance, $$E[s(k)]=0, \, E[s(k)s(j)^H]=\delta(k-j), \, E[s(k)s(j)]=0 \tag{10}$$

Noise

H 2—Noise w(k) is a Gaussian, circular, white process stationary in space and time with variance $\sigma^2$, $$E[\underline{w}(k)\underline{w}(k)^H]=\sigma^2 I_{pq} \tag{11}$$

where Ipq is the identity matrix

Transmission/Reception Filter

H 3—The transmission/reception filter g(t) has a finite support, g(t)=0 for t ∉ [0, LgT[ where Lg corresponds to the filter length and T to the sampling period.

H 4—The transmission/reception filter $g(t) \leftrightarrow G(f)$ is approximately as follows for a limited band, with band $B_g$ $$G(f) \approx 0 \, \forall f \notin [-B_g, B_g] \tag{12}$$

and G(f) does not cancel out within a given band β, $$G(f) \neq 0 \, \forall f \in [-B_g, B_g] \tag{13}$$

Propagation Channel

H 5—The signal is a narrow band for the sensor network, i.e. it is assumed that the propagation time for the signal to pass from one sensor to the next is very much less than the inverse of the signal band.

H 6—The channel is constant over an observation interval. The Doppler shift and carrier residues are assumed to be negligible.

H 7—The time difference between the first and last path is finite, and it has an upper limit: $\Delta\tau_{max}$.

where d is the number of paths and $\tau_k$ is the delay and $a_k$ is the vector of q×1 dimension antennas associated with the kth path, the channel response being expressed as follows.

$$h(t)=\sum_{k=1}^{d} a_k g(t-\tau_k) \tag{14}$$

By sampling at T/p, $$h_{\frac{T}{p}}(z)=\sum_{k=-\infty}^{\infty} h(kT/p)z^{-k}=\sum_{k=1}^{d} a_k g_{\frac{T}{p}}(\tau_k;z) \tag{15}$$

where $$g_{\frac{T}{p}}(\tau;z) \triangleq \sum_{n} g\left(n\frac{T}{p}-\tau\right)z^{-n} \tag{16}$$

is the transform into z of the transmission/reception filter shifted by τ and sampled at T/p.

Furthermore, $\underline{h}(z)$ is the response in z to the symbol rate of the combined system, $$\underline{h}(z)=\sum_{k=-\infty}^{\infty} \underline{h}(kT)z^{-k} \tag{17}$$

The received signal follows the equivalent single source multi-output discrete model:

$$\underline{y}(k)=[\underline{h}(z)]s(k)+\underline{w}(k) \tag{18}$$

it is interesting to note that $$h_{\frac{T}{p}}(z)=\sum_{i=1}^{p} h^{(i)}(z^p)z^{-i} \tag{19}$$

where $h^{(i)}(z)=\Sigma_{k=-\infty}^{\infty} h^{(i)}(k)Z^{-k}$ are the multi-phase components of the oversampled channel.

According to assumptions H3 and H7, the pulse response of the global multi-sensor transmission channel has a finite length.

Therefore, the degree of the discrete responses $\underline{h}(z)$ and $h_{T/p}(z)$ is finite. We note $L=\deg(\underline{h})$ i.e. the degree of at least one of the paths is equal to L, the degrees of the others may be lower, $$\underline{h}(z)=\underline{h}(0)+\underline{h}(1)z^{-1}+\ldots+\underline{h}(L)z^{-L}$$

Similarly, we denote $L_{T/p}=\deg(h_{T/p})$. We have $pL \leq L_{T/p} \leq p(L+1)-1$. In order to simplify the presentation, we assume that $$L_{T/p}+1=p(L+1).$$

Furthermore, second order algorithms are based on the following diversity condition for the global transmission channel:

H 8 The polynomial vector h(z) is irreducible, i.e. these components do not have any common roots.

Some Notations and Tools

If $\{b^{(1)}(z), \ldots, b^{(r)}(z)\}$ are r scalar polynomials, $b(z)=[b^{(1)}(z), \ldots, b^{(r)}(z)]^T$ is a polynomial vector (a vector for which the coordinates are polynomials) with dimension r. The maximum degree of the polynomials is called the order or the degree of the vector deg(b(z)) $\{b^{(1)}(z), \ldots, b^{(r)}(z)\}$. If $L_b$ is the degree of b(z), then $$b(z) = \sum_{k=0}^{Lb} b(k) z^{-k} \quad (20)$$

where $b(k)=[b^{(1)}(k), \ldots, b^{(r)}(k)]^T$. The vector associated with b(z), i.e. containing all its coefficients, is denoted by an arrow, $$\vec{b} = [b(0)^T \ldots b(L_b)^T]^T \quad (21)$$

with dimension $r(L_b+1) \times 1$. Therefore, in particular $\vec{h}$ corresponds to the dimension vector q.p(L+1)×1 associated with $\underline{h}(z)$ and $h_{T/p}(z)$ i.e. containing all their coefficients, $$\vec{h} = [\underline{h}(0)^T \ldots \underline{h}(L)^T]^T$$

$$\vec{h} = [\underline{h}(0)^T \ldots \underline{h}(L)^T]^T \quad (22)$$

$$= \left[ h_{\frac{T}{p}}(0)^T \ldots h_{\frac{T}{p}}\left(L \frac{T}{p}\right)^T \right]^T \quad (23)$$

Furthermore, let K be an integer defining the number of multidimensional observations, $_k(b)$ is the Sylvester matrix (i.e. Toeplitz per block) with dimension $r(K+1) \times (K+L_b+1)$ associated with the polynomial b(z), and defined by $$\tau_k(b) = \begin{bmatrix} b(0) & \ldots & b(L_b) & 0 & \ldots & 0 \\ 0 & b(0) & & b(L_b) & \ddots & \vdots \\ \vdots & \ddots & \ddots & & \ddots & 0 \\ 0 & \ldots & 0 & b(0) & \ldots & b(L_b) \end{bmatrix} \quad (24)$$

Finally, let B(z) be a polynomial matrix with dimension r×D and degree $L_b$, $$B(z) = [b_1(z), \ldots, b_D(z)]$$

where $b_i(z)$ is a polynomial vector with dimension r. We will use $$B = [\vec{b}_1, \ldots, \vec{b}_D]$$

to denote the associated matrix with dimensions $r(L_b+1) \times D$, and $D_K(B)$ to denote the Sylvester block matrix with dimensions $r(K+1) \times (K+L_b+1)D$ defined by $$D_k(B) = [T_k(b_1), \ldots, T_k(b_D)] \quad (25)$$

$\lambda_{min}(A)$ denotes the smallest eigenvalue of matrix A and $vp_{min}(A)$ is the eigenvector associated with $\lambda_{min}(A)$.

Process According to the Invention

The process according to the invention is based particularly on taking account of the specular type channel structure to determine the specific parameters of a signal propagation or transmission channel, particularly in a communication system like that shown in FIG. 1. For example, the parameters determined jointly may be the time vector (τ) of delay vectors ($\tau_k$), and the antenna vector (a) of vectors ($a_k$).

A first alternative embodiment of the process or the "a priori process" is particularly suitable when the transmission/reception filter is known.

A second alternative embodiment of the process or "no a priori process" is more suitable for the case in which the characteristics of the transmission/reception filter are not known.

A Priori Process

The process assumes that the transmission filter g(t) is known. The various steps in the a priori process or algorithm according to the invention are based on the fact that equation (15) is written in "vectorial" form as follows:

$$\vec{h} = G_{L,d}(\tau) a \quad (26)$$

$\vec{h}$ is the vector with dimension q.p.(L+1) containing all coefficients of the response $h_{T/p}(z)$, a is the vector with dimension q.d containing all antenna vectors $a = [a_1^T \ldots a_d^T]^T$ and $G_{L,d}(\tau)$ is a matrix with dimension q.p(L+1)×q.d containing delayed versions sampled at T/p of the transmission filter:

$$G_{L,d}(\tau) = \begin{pmatrix} g(0-\tau_l) & \ldots & g(0-\tau_d) \\ g\left(\frac{T}{p} - \tau_l\right) & \ldots & g\left(\frac{T}{p} - \tau_d\right) \\ \vdots & & \vdots \\ g(L+1)T - \frac{T}{p} - \tau_l & \ldots & g(L+1)T - \frac{T}{p} - \tau_d \end{pmatrix} \otimes I_q \quad (27)$$

$I_q$ is the identity matrix with dimension q. We will use τ to denote the vector with dimension d containing all delays $\tau = [\tau_l, \ldots \tau_d]$ For example, the different steps in the process could be as follows:

1. Choose the length of the global propagation channel taking account of transmission and reception, $\hat{L} \geq L_g + \Delta\tau_{max}$ and the value of the number of observations $K \geq \hat{L}$ where $\Delta\tau_{max}$ is the largest possible value of the relative delay between two paths.

2. Calculate the sub-space criterion matrix $Q_{\hat{L}}(\hat{R})$, for example as follows:

Calculate the empirical estimate of the covariance matrix:

$$\hat{R} = \frac{1}{N-K} \sum_{k=0}^{N-K} \vec{y}_K(k) \vec{y}_K(k)^H \quad (28)$$

where $$\vec{y}_K(k) = [y(0)^T y(T/p)^T \ldots y(KT-T/p)^T]^T \quad (29)$$

$$= [\underline{y}(0)^T \ldots \underline{y}(K)^T]_{pq(K-1)}^T \quad (30)$$

and let N-K be the number of independent observations.

Build the matrix $\hat{G}_{\hat{L}}$ for example using the eigenvectors associated with the $pq(K+1)-(K+\hat{L}+1)$ smallest eigenvalues of $\hat{R}$. $\hat{G}_{\hat{L}}$ can also be obtained from the breakdown of the data matrix $Y = {}^{66}[\vec{y}(K) \ldots \vec{y}(N)]$.) into eigenelements. Then form the projection matrix $\hat{\Pi}_{\hat{L}} = \hat{G}_{\hat{L}} \hat{G}_{\hat{L}}^H$ Form the sub-space criterion matrix $Q_{\hat{L}}(\hat{R}) = D_{\hat{L}}(\hat{\Pi}_{\hat{L}}) D_{\hat{L}} (\hat{\Pi}_{\hat{L}})^H$ 3. Estimate the number of paths, for example $\hat{d}$, by using the method described in the "Detection of signals by information theory criteria" reference by M. Wax and T. Kailath, IEEE Trans.on Acoust. and Sig. Proc., 33(2): 387-392, April 1985.

4. Estimate the delays $$\hat{\tau} = \arg\min_\tau J_{\hat{L},\hat{d}}(\tau)$$

where $$J_{\hat{L},\hat{d}}(\tau) = \frac{\lambda_{\min}\left(G_{\hat{L},\hat{d}}(\tau)^H Q_{\hat{L}}(\hat{R}) G_{\hat{L},\hat{d}}(\tau)\right)}{\lambda_{\min}\left(G_{\hat{L},\hat{d}}(\tau)^H G_{\hat{L},\hat{d}}(\tau)\right)} \quad (31)$$

This is done by applying the iterative process described below:

Let d=1. Obtain an estimate $\hat{\tau}_1$ of $\tau_{01}$ by minimizing $\check{J}_{\hat{L},\hat{d}}(\tau_1)$ Let d=2. Obtain and estimate $\hat{\tau}_2$ of $\tau_{02}$ by minimizing $\check{J}_{\hat{L},\hat{d}}([\tau_1,\tau_2])$ as a function of $\tau_2$ and keeping $\tau_1$ equal to the estimate $\hat{\tau}_1$ obtained in the first step. Then, obtain a new estimate of $[\tau_{01}, \tau_{02}]$ using a multidimensional minimization of $\check{J}_{\hat{L},\hat{d}}([\tau_1,\tau_2])$ and using the values $[\hat{\tau}_1, \hat{\tau}_2]$ that were obtained above as initial values.

Iterate this process until d=$\hat{d}$, for all possible paths in order to obtain the delay vector.

5. Estimate the value of the antenna vector by $$\hat{a} = vp_{\min}(G_{\hat{L},\hat{d}}(\hat{\tau})^H Q_{\hat{L}}(\hat{R}) G_{\hat{L},\hat{d}}(\hat{\tau}))$$

6. Create the estimate of the pulse response: $\vec{\hat{h}} = G_{\hat{L},\hat{d}}(\hat{\tau})\hat{a}$ No A Priori Process The second alternative of the process corresponds to a parameter estimating algorithm that is entirely or mostly blind. As in the first alternative embodiment, the associated algorithm takes account of the specular nature of the propagation channel in order to determine its parameters, and particularly the antenna vector and the characteristics time vector. Unlike the first variant, it does not require advanced knowledge of the transmission filter. It simply assumes that the transmission filter has a limited band and that its band is known approximately.

For example, the various steps in the process or algorithm are as follows:

1. Estimate $\hat{L}g$, the length of the transmission filter, and choose $\hat{L} \geq \hat{L}_g + \Delta\tau_{max}$ and $K \geq \hat{L}$ 2. Apply the sub-space method described in item 2 of the a priori process:

Estimate the covariance matrix $\hat{R}$, for example using the steps described above corresponding to equation (Eq. 28).

Calculate the projection matrix on the noise space $\hat{\Pi}_{\hat{L}}$ starting from the eigenvectors associated with the $pq(K+1)-(K+\hat{L}+1)$ null eigenvalues of the matrix $\hat{R}$. Form the matrix $Q_{\hat{L}}(\hat{R}) = D_{\hat{L}}(\hat{\Pi}_{\hat{L}}) D_{\hat{L}}(\hat{\Pi}_{\hat{L}})^H$ Obtain $\vec{\hat{h}}$ the eigenvector associated with the smallest eigenvalue of the matrix $Q_{\hat{L}}(\hat{R})$ and form $$\hat{h}_{\frac{T}{p}}(z)$$

3. Form the new parametric criterion:
Choose the value of the channel length $$R \geq \hat{L}_{\frac{T}{p}} = p(\hat{L}+1) - 1$$

and form the matrix $$\tau_R(\hat{h}_{\frac{T}{p}})$$

Calculate the matrix $$\hat{\Omega}_{\hat{L}_{\frac{T}{p}}}$$

containing eigenvectors associated with the $$q(R+1) - \left(R + \hat{L}_{\frac{T}{p}} + 1\right) \text{ smallest eigenvalues of } \tau_R(\hat{h}_{\frac{T}{p}})^H$$

-Form the matrix $D_{\hat{L}_{\frac{T}{p}}}(\hat{\Omega}_{\hat{L}_{\frac{T}{p}}})$ 4. Estimate the number of paths $\hat{d}$, for example using the method referenced above for step 3 in the first alternative embodiment.

5. Determine the minimum value of the band of the transmission filter: $\beta$, usually $\beta = 1/T$.

6. Choose $\tilde{v}(t)$, a continuous filter with band limited to the $\beta$ band. Form the filter $v(t)$, $$\begin{cases} v(t) = \tilde{v}(t) & 0 \leq t \leq Lv \leq \hat{L}g \\ v(t) = 0 & \text{elsewhere} \end{cases} \quad (32)$$

7. Estimate the delays $$\hat{\tau} = \arg\min_\tau I_{\hat{L},\hat{d}}(\tau)$$

where $$I_{\hat{L},\hat{d}}(\tau) = \frac{\lambda_{\min}\left(V_{\hat{L},\hat{d}}(\tau)^H D_{\hat{L}_{\frac{T}{p}}}(\hat{\Omega}_{\hat{L}_{\frac{T}{p}}}) D_{\hat{L}_{\frac{T}{p}}}(\hat{\Omega}_{\hat{L}_{\frac{T}{p}}})^H V_{\hat{L},\hat{d}}(\tau)\right)}{\lambda_{\min}\left(V_{\hat{L},\hat{d}}(\tau)^H V_{\hat{L},\hat{d}}(\tau)\right)} \quad (33)$$

using the iterative process proposed for the parametric subspace method. (The matrix $V_{\hat{L},\hat{d}}(\tau)$ is defined in the same way as the matrix $G_{\hat{L},\hat{d}}(\tau)$ but from the filter $v(t)$.)

8. Estimate antenna vectors:

$$\hat{a} = \nu P_{\min}\left(V_{\hat{L},\hat{a}}(\hat{\tau})^H D_{\hat{L}\frac{T}{p}}(\hat{\Omega}_{\hat{L}\frac{T}{p}}) D_{\hat{L}\frac{T}{p}}(\hat{\Omega}_{\hat{L}\frac{T}{p}})^H V_{\hat{L},\hat{a}}(\hat{\tau})\right) \quad (34)$$

Possible Applications

The process according to the invention is applied, for example in the domains mentioned below for illustrative purposes and in no way limitative.

Cellular Networks

For cellular transmissions, the transmission standard is known. Therefore, the standard transmission filter is known and it is preferable to apply the a priori process using advance knowledge of the transmission/reception filter. The potential applications are as follows:

Equalization

Propagation acts as time convolution. Except for very low throughput communications (a few hundred bits per second), this time dispersion induced by propagation creates interference between symbols (IES). In order to best recover the transmitted symbols, the dispersive effect of the channel must be compensated by an equalization step like that described in the book entitled "Digital Communications", written by J. G. Proakis and published by McGraw Hill editions, 1989. If the transmission/reception filter is known, the global response can be built up starting from knowledge of propagation channel parameters, and an equalization step can be applied. The advantage of this approach is that in general, by estimating propagation parameters rather than the global response, the number of parameters to be estimated is smaller so that it is usually possible to reduce the variance of the estimators. The identification quality and equalization performances can thus be improved significantly. Furthermore, some characteristic parameters of the propagation channel (arrival delays and angles) do not change very much from one frame to the next. Parametric modelling makes it more efficient to monitor variations of channel parameters and further improves the identification quality, for example such as described in the "Multi-channel MLSE equalizer with parametric FIR channel identification" reference by J. T. Chen and A. Paulraj, in VTC, Proc., pages 710-713, 1997.

Positioning

Positioning of the transmitter is a classical problem in military applications, and has recently become the subject of close attention for civil applications in mobile communications. Positioning of mobiles in a cellular network makes it possible to provide many services such as positioning of emergency calls, management of charging, detection of fraud, assistance with cellular planning, improvement in organizing the "handover" as described in "Position location using wireless communications on highways of the future" reference by T. S. Rappaport, J. H. Reed and B. D. Woerner, IEEE Commun. Mag., October 1996.

Several techniques can be used for positioning. The most classical is triangularization. In this case, positioning is done using two or three separate receivers (base stations) each estimating the angles and/or arrival times of the transmitted signal as described in the "Mobile Localization in a GSM Network" reference by H. El Nahas, PhD thesis ENST, June 1999. This system has some disadvantages, which is why positioning algorithms from a single station were developed. These positioning techniques always require prior knowledge of propagation characteristics. For example, a positioning process is described in the reference entitled "Procédés de localisation spatio-temporel de radiomobiles en milieu urbain" (Space-time positioning processes for radio-mobiles in urban environment) by M. Chenu-Tournier, A. Ferréol and J-J. Monot, Technical report, TCC, 1997.

Antenna Filtering—SDMA

Knowledge of spatial characteristics of the different paths may be used to focalise transmission in the main arrival direction and thus minimize the effect of multiple paths on receivers (uplink beamformer design, downlink transmission design).

Spectrum Monitoring

In the context of a spectrum radio-electrical analysis, the receiver has no prior knowledge about the transmitter. The reception system scans the spectrum, intercepts a signal transmitted by an unknown transmitter and analyses it to extract some information from it to be able to listen to the transmission or determine the position of the transmitter. In this context, it is unlikely that the transmission filter will be known and the no a priori process is the most suitable for estimating propagation channel parameters ($\tau$; a). In this case, since the transmission filter is not known, it is impossible to equalize the received signal, but knowledge of parameters ($\tau$; a) would make it possible to use the applications mentioned below.

Positioning

The main application is positioning. In HF, positioning with a single station conventionally uses an initial step of ionospheric forecasts. Knowing the angle of incidence and the electronic density profile (by ionospheric forecasting), a ray plotting method using Descartes law can be used to reconstitute the path of the wave received on the sensors network according to one of the following references:

"Comparison of the fixing accuracy of single-station location of long range transmitters, by H. C. Höring, IEEE Proceedings, 37(3): 173-176, June 1990.

"Ioniospheric modelling in support of single station location of long range transmitters by L. F. McNamara, Journal of Atmospheric and terrestrial Physics, 50(9): 781-795, 1988.

Knowledge of arrival times can also eliminate some ambiguities due to multi-skip.

Others

Spatial filtering is possible if antenna vectors are known. Knowledge of delays is a means of recombining propagation paths in phase. The use of one or both of the two known values may be a first step in implementing a signal analysis system.

The invention claimed is:

1. A blind or partially blind process to determine characteristic space-time parameters of a propagation channel in a system comprising at least one reception sensor, the process comprising:

receiving a signal y(t) with the at least one reception sensor;

determining antenna vectors (a) and time vectors ($\tau$) starting from second order statistics of the received signals based on a specular structure of the propagation channel;

selecting a length of the propagation channel $\hat{L}$ such that $\hat{L} \geq Lg + \Delta\tau_{max}$, where Lg denotes a filter length and $\Delta\tau_{max}$ denotes a largest possible value of a relative delay between two paths, and a value of a number of observations K satisfies $K \geq \hat{L}$;

determining a sub-space criterion matrix $Q_{\hat{L}}(\hat{R})$, where $\hat{R}$ denotes a covariance matrix;
estimating a number of paths $\hat{d}$;
estimating delays $\hat{\tau}$, where $$\hat{\tau} = \arg\min_{\tau} J_{\hat{L},\hat{d}}(\tau),$$

where $$J_{\hat{L},\hat{d}}(\tau) = \frac{\lambda_{\min}\left(G_{\hat{L},\hat{d}}(\tau)^H Q_{\hat{L}}(\hat{R}) G_{\hat{L},\hat{d}}(\tau)\right)}{\lambda_{\min}\left(G_{\hat{L},\hat{d}}(\tau)^H G_{\hat{L},\hat{d}}(\tau)\right)},$$

$\lambda_{min}$ denotes a smallest eigenvalue of a matrix, and ($G_{\hat{L},\hat{d}}(\tau)$) denotes a matrix containing delayed sampled versions of the received signal;
estimating a value of an antenna vector $\hat{a}$ by $\hat{a} = vp_{min}(G_{\hat{L},\hat{d}}(\tau)^H Q_{\hat{L}}(\hat{R}) G_{\hat{L},\hat{d}}(\tau))$, where $vP_{min}$ denotes an eigenvector associated with $\lambda_{min}$; and
forming an estimate of a pulse response $\hat{h}$ such that $\hat{h} = G_{\hat{L},\hat{d}}(\tau)\hat{a}$.

2. The process according to claim 1, further comprising:
oversampling the received signal.

3. The process according to claim 1, wherein the receiving includes receiving the signal on at least two sensors, and the method further comprises:
oversampling the received signal.

4. The process according to claim 3, wherein a sampling period corresponds to T/p, where T denotes a symbol period and p denotes a number of outputs on each sensor.

5. A blind or partially blind process to determine characteristic space-time parameters of a propagation channel in a system comprising at least one reception sensor, the process comprising:
receiving a signal y(t) with the at least one reception sensor;
determining antenna vectors (a) and time vectors ($\tau$) starting from second order statistics of the received signals based on a specular structure of the propagation channel;
estimating $\hat{L}g$, which denotes a length of a transmission filter and choosing $\hat{L}$ such that $\hat{L} \geq \hat{L}g + \Delta\tau_{max}$ and $K \geq \hat{L}$, where $\hat{L}$ denotes a length of the propagation channel, $\Delta\tau_{max}$ denotes a largest possible value of a relative delay between two paths, and K denotes a value of a number of observations;
determining a sub-space criterion $Q_{\hat{L}}(\hat{R})$, said determining including,
estimating a covariance matrix $\hat{R}$,
calculating a projection matrix onto noise space $\hat{\Pi}_{\hat{L}}$ using eigenvectors associated with pq(K+1)−(K+$\hat{L}$+1) null eigenvalues of the covariance matrix $\hat{R}$, where q denotes a number of reception sensors and p denotes a number of outputs on each sensor, and forming matrix $Q_{\hat{L}}(\hat{R}) = D_{\hat{L}}(\hat{\Pi}_{\hat{L}}) D_{\hat{L}}(\hat{\Pi}_{\hat{L}})^H$;
obtaining an $\vec{h}$ eigenvector associated with a smallest eigenvalue of the matrix $Q_{\hat{L}}(\hat{R})$ and forming $$\hat{h}_{\frac{T}{p}}(z)$$

which represents a discrete response and T/p denotes a sampling rate, where T denotes a symbol period;
choosing a value of the propagation channel length such that $$R \geq \hat{L}_{\frac{T}{p}} = p(\hat{L}+1) - 1$$

forming a matrix $\tau_R(\hat{h}_{T/p})$;
calculating a matrix $$\hat{\Omega}_{\hat{L}_{\frac{T}{p}}}$$

containing eigenvectors associated with $$q(R+1) - (R + \hat{L}_{\frac{T}{p}} + 1)$$

smallest eigenvalues of $\tau_R$;
forming matrix $$D_{\hat{L}_{\frac{T}{p}}}(\hat{\Omega}_{\hat{L}_{\frac{T}{p}}});$$

estimating a number of paths $\hat{d}$;
choosing $\tilde{v}(t)$ to have a continuous filter with a limited band B and forming filter v(t), $$\begin{cases} v(t) = \tilde{v}(t) & 0 \leq t \leq Lv \leq \hat{L}g \\ v(t) = 0 & \text{elsewhere} \end{cases};$$

estimating delays $\hat{\tau}$ such that $$\hat{\tau} = \arg\min_{\tau} I_{\hat{L},\hat{d}}(\tau),$$

where $$I_{\hat{L},\hat{d}}(\tau) = \frac{\lambda_{\min}\left((V_{\hat{L},\hat{d}}(\tau))^H D_{\hat{L}_{\frac{T}{p}}}(\hat{\Omega}_{\hat{L}_{\frac{T}{p}}}) \left(D_{\hat{L}_{\frac{T}{p}}}(\hat{\Omega}_{\hat{L}_{\frac{T}{p}}})\right)^H V_{\hat{L},\hat{d}}(\tau)\right)}{\lambda_{\min}\left((V_{\hat{L},\hat{d}}(\tau))^H V_{\hat{L},\hat{d}}(\tau)\right)}.$$

$\lambda_{min}$ denotes the smallest eigenvalue of a matrix, and $V_{\hat{L},\hat{d}}(\tau)$ denotes a matrix containing delayed sample versions of the received signal; and
estimating a value of an antenna vector $\hat{a}$ by $$\hat{a} = vP_{\min}\left((V_{\hat{L},\hat{d}}(\hat{\tau}))^H D_{\hat{L}_{\frac{T}{p}}}(\hat{\Omega}_{\hat{L}_{\frac{T}{p}}}) \left(D_{\hat{L}_{\frac{T}{p}}}(\hat{\Omega}_{\hat{L}_{\frac{T}{p}}})\right)^H V_{\hat{L},\hat{d}}(\hat{\tau})\right),$$

where $vP_{min}$ denotes an eigenvector associated with $\lambda_{min}$.

6. The process according to claims 1 or 5, further comprising:
monitoring a spectrum of the propagation channel for positioning purposes from one or several HF stations.

7. The process according to claims 1 or 5, further comprising:
equalizing, positioning, or spatial filtering standard communication links.

8. The process according to claim 5, further comprising: oversampling the received signal.

9. The process according to claim 5, wherein the receiving includes receiving the signal on at least two sensors, and the method further comprises:
oversampling the received signal.

10. The process according to claim 9, wherein a sampling period corresponds to T/p.

* * * * *